Patented Dec. 21, 1948

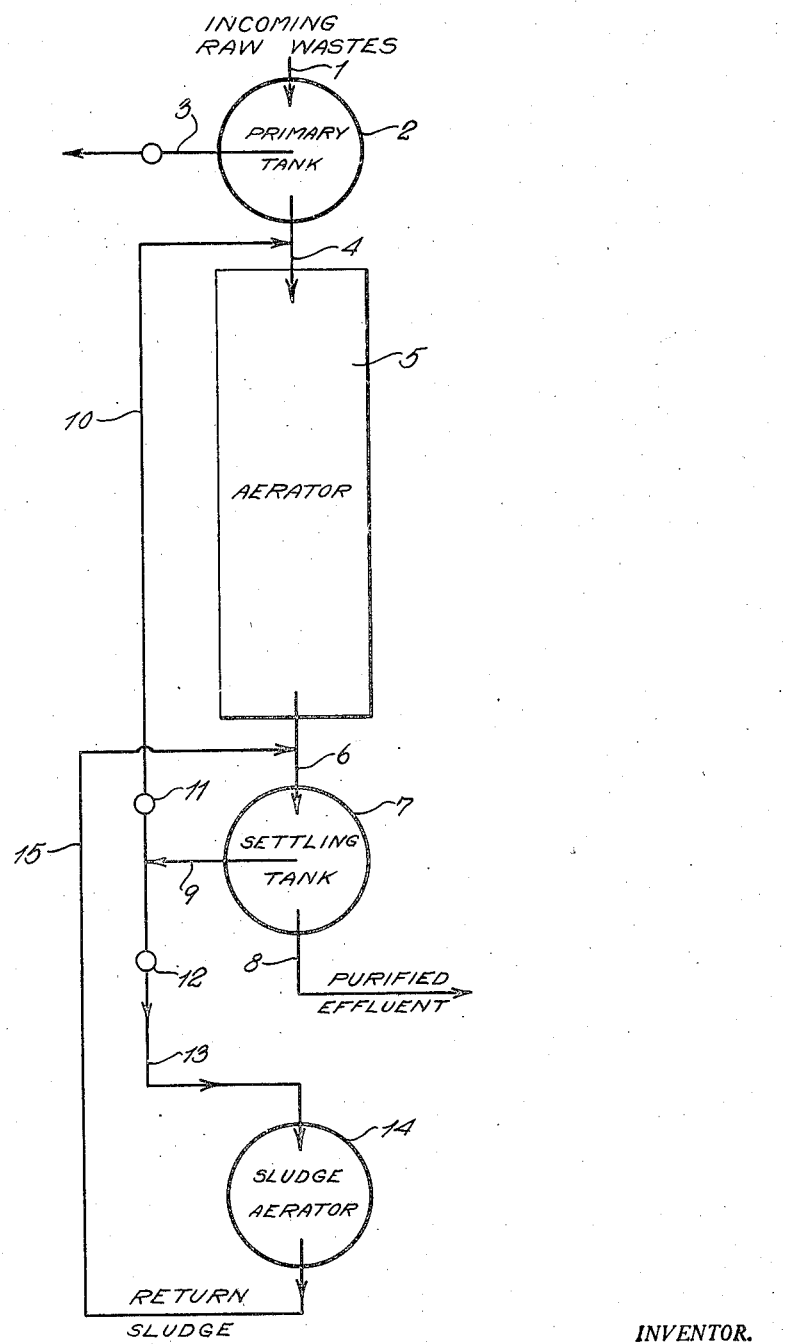

2,457,057

UNITED STATES PATENT OFFICE 2,457,057

WASTE PURIFICATION PROCESS AND APPARATUS

Edward B. Mallory, Tenafly, N. J.

Application June 30, 1945, Serial No. 602,546

2 Claims. (Cl. 210—8)

The invention relates to the purification of sewage and other wastes by the use of the so-called activated sludge process (which I believe is to be more properly described as the oxidized sludge process), according to which process the incoming wastes after appropriate primary treatment are passed into an aerator and then from the aerator into a clarifier or settling tank in which latter sludge is settled out in the lower zone of the tank and the supernatant purified effluent drawn off from the top, so-called return sludge as thus obtained in the clarifier being returned into admixture with the wastes under treatment in the aerator to form so-called mixed liquor which is aerated and passed into the settling tank as above described.

In order to increase the capacity of purification apparatus of the above character, particularly under circumstances where the colloidal component of the raw sewage is relatively high and a heavy mixed liquor concentration is required to afford complete clarification and purification, it has been previously known to add to the above cycle the step of aerating or oxidizing the return sludge on its way back into admixture with the wastes under treatment. The present invention relates particularly to purification processes and apparatus of the above character wherein the above mentioned step of recirculating the return sludge is employed. Aeration of the return sludge as above described acts to promote the conversion or driving off of impurities which the sludge particles have previously absorbed, but I have found that this oxidizing step also causes the recirculated oxidized sludge particles to re-enter the main cycle in a condition which impairs the purifying action which they are relied upon to perform in the main aerating and settling tanks of the apparatus.

Thus the efficacy of the process is impaired for the above reason by the step of oxidizing or aerating the return sludge if employed. I have also found that the above objections to the use of the above mentioned step of aerating return sludge may be largely overcome, and the efficiency of the process substantially augmented, if the aerated returning sludge, before entering the mixed liquor in the main aerator, is subjected to a settling or sludge particle contracting step similar to the operation which takes place in the clarifier or settling tank wherein the sludge settles out as above described. In fact, as later described, this settling operation may be performed on aerated return sludge in the main clarifier or settling tank itself.

Further objects and advantages of the invention will be in part obvious and in part specifically referred to in the description hereinafter contained which, taken in conjunction with the accompanying drawings, discloses the invention as carried out by the aid of certain preferred forms of apparatus. The disclosure, however, should be considered as only illustrative of the principles of the invention in its broader aspects. In the drawings—

The single figure is a schematic diagram showing in simplified form one type of apparatus capable of being operated in accordance with the invention.

In the figure the invention is shown as carried out by a purification apparatus wherein the raw waste to be treated, as coming in at 1, first enters a primary treatment tank 2 which may be of known character, and from which primary sludge may be conducted for disposal as indicated at 3. The wastes remaining for treatment then pass as indicated at 4 into an aerator 5, various forms of which are also known to the art. From the aerator 5 the wastes under treatment pass as indicated at 6 into a so-called clarifier or settling tank 7 which may also be of known construction, the purified effluent passing off as indicated at 8, and sludge settled out in the bottom of the settling tank 7 being drawn off as indicated at 9.

By adding to the above parts merely the step of recirculating sludge through the path indicated at 10, back into admixture with the wastes entering the aerator 5 to form the so-called mixed liquor which is oxidized in said aerator, we would have merely a simplified diagram of a conventional so-called activated sludge purification cycle. In accordance with the present invention there is superimposed upon such cycle as previously stated, the step of aerating the so returning sludge, and the further step of settling and contracting the aerated sludge before recirculating it back into the aerator 5.

In the form of apparatus shown in the figure, by appropriate adjustment of the valves 11 and 12, sludge may pass through the conduit 9 above mentioned to a conduit 13 leading to the sludge aerator indicated diagrammatically at 14, suitable forms of which are known. The aerated or oxidized return sludge then passes through a conduit 15 which leads back to the conduit 6 above described. Thus the oxidized sludge is returned to the settling tank 7 for a settling or contracting operation, after which the thus reaerated and contracted sludge may pass through conduit 9, valve 11 and conduits 10 and 4 to form a part of the mixed liquor in the aerator 5, and the clarifier or settling tank of the conventional purification cycle also serves to recondition reaerated sludge prior to its return to the aerator for admixture with the incoming wastes.

Preferably the operation of the process is controlled in accordance with Patent No. 2,154,132, issued to me on April 11, 1939, entitled "Process of controlling the purification of sewage," in order that the return sludge entering the conduit 13 may be of proper character.

This application is a continuation of my prior copending application Serial Number 506,821, filed October 19, 1943 (now abandoned), for "Waste purification process and apparatus."

While the invention has been disclosed as carried out by the above described particular form of apparatus it should be understood that changes may be made therein without departing from the invention in its broader aspects, within the scope of the appended claims.

I claim:

1. A waste purification process of the character described which includes passing wastes to be purified successively through an aerator and clarifier, settling sludge in said clarifier, withdrawing settled sludge from said clarifier, aerating sludge which has been so withdrawn, returning thus aerated sludge to the aforesaid clarifier to settle and contract the size of the sludge particles in admixture with the wastes in said clarifier, and then returning thus aerated and contracted sludge back into admixture with wastes under treatment in said aerator.

2. A waste purification apparatus of the character described including a mixed liquor aerator, a clarifier, means for conducting wastes to be treated to said aerator and for conducting aerated mixed liquor from said aerator to said clarifier, means for recirculating sludge from said clarifier back into admixture with wastes under treatment in said aerator, said apparatus also including a sludge aerator, means for conducting sludge from said clarifier to said last mentioned aerator, and means for conducting aerated sludge from said last mentioned aerator back to said clarifier, to contract the size of the aerated sludge particles in said clarifier prior to recirculation thereof back into admixture with the wastes in the aerator as aforesaid.

EDWARD B. MALLORY.

REFERENCES CITED

The following references are of record in the file of this patent:

UNITED STATES PATENTS

| Number | Name | Date |
| --- | --- | --- |
| Re. 22,144 | Ward | July 21, 1942 |
| 1,904,916 | Coombs | Apr. 18, 1933 |
| 1,932,246 | Fischer | Nov. 27, 1934 |
| 2,027,370 | Currie | Jan. 14, 1936 |
| 2,077,498 | Streander | Apr. 20, 1937 |
| 2,089,162 | Goudey et al. | Aug. 3, 1937 |
| 2,118,266 | Nordell | May 24, 1938 |
| 2,154,132 | Mallory | Apr. 11, 1939 |
| 2,228,017 | Pecker | Jan. 7, 1941 |
| 2,337,507 | Thayer | Dec. 21, 1943 |
| 2,349,390 | Tolman | May 23, 1944 |
| 2,404,223 | Durdin, 3rd | July 16, 1946 |
| 2,419,492 | Green | Apr. 22, 1947 |

FOREIGN PATENTS

| Number | Country | Date |
| --- | --- | --- |
| 218,399 | Great Britain | June 27, 1924 |